United States Patent [19]
Archibald et al.

[11] Patent Number: 5,166,313
[45] Date of Patent: Nov. 24, 1992

[54] DIAMANTANE MODIFIED RIGID-ROD POLY BENZAZOLE AND METHOD OF MANUFACTURE

[75] Inventors: Thomas G. Archibald, Sacramento; Aslam A. Malik, San Dimas; Kurt Baum, Pasadena, all of Calif.

[73] Assignee: Fluorochem, Inc., Azusa, Calif.

[21] Appl. No.: 693,166

[22] Filed: Apr. 29, 1991

[51] Int. Cl.$^5$ .................. C08G 73/18; C08G 73/22; C08G 75/32
[52] U.S. Cl. ...................... 528/344; 528/176; 528/183; 528/190; 528/337; 528/342
[58] Field of Search ............ 528/344, 337, 342, 190, 528/176, 183

[56] References Cited

U.S. PATENT DOCUMENTS 3,464,957  9/1969  Driscoll ........................ 528/344

Primary Examiner—Harold D. Anderson
Attorney, Agent, or Firm—Norton R. Townsley; Thomas N. Giaccherini

[57] ABSTRACT

The present invention comprises diamantane groups interspersed among benzothiazole groups, benzoxazole groups or benzimidazole groups. This constitutes a rigid-rod polymer with stable cycloaliphatic groups interspersed into the aromatic-heteroaromatic backbone of the rods. The presence of the aliphatic groups decreases crystallinity by adding disorder to the rods thus minimizing interactions between the heteroaromatic groups. The interspersed aliphatic groups act as insulators and thus permit greater relative protonation. Also, the reduced conjugation of the aromatic-heteroaromatic rings reduces the color of the polymers. The preferred method of manufacturing this improved rigid-rod polymer is by condensation of dimethyl diamantanecarboxylate with 2,5-diamino-1,4-benzenedithiol, 1,2,4,5-tetraaminobenzene, or 4,6-diamino-1,3-benzenediol.

11 Claims, 3 Drawing Sheets

DIAMANTANE MODIFIED RIGID-ROD POLY BENZAZOLE AND METHOD OF MANUFACTURE

STATEMENT OF GOVERNMENT INTEREST

The Government has rights in this invention pursuant to Contract F33615-89-C-5630 awarded by the Department of the Air Force.

BACKGROUND OF THE INVENTION

The present invention relates to the field of polymers and more particularly to the field of rigid-rod polymers.

In 1981, the U.S. Air Force sponsored research into new structural materials having low density, high strength, and high modulus. This research was reported in *Macromolecules*, 1981, 14, pp. 909-954. These new materials were formed by condensing tetrafunctional benzene derivatives with aromatic p-dicarboxylic acids to give heteroaromatic rings. The resulting polymers are known as rigid-rod polymers. One rigid-rod polymer, polybenzothiozole (PBT), is formed by the condensation of 2,5-diamino-1,4-benzenedithiol with terephthalic acid in polyphosphoric acid. Another, polybenzoxazole is formed by the condensation of 4,6-diamino-1,3-benzenediol with terephthalic acid. A third, polybenzimidazole is formed by the condensation of 1,2,4,5-tetraaminobenzene with terephthalic acid. Rigid-rod polymers were found to exhibit liquid crystalline behavior in solution, suggesting potential uses as nonlinear optical materials or in molecular composites. Several theoretical and structural studies on these materials have been published. See for example, Wolfe, J. F. "Polybenzothiazoles and Oxazoles", *Encyclopedia of Polymer Science and Engineering* 1988, 11, 601.

The high intermolecular attraction and degree of molecular order of rigid-rod polymers, which results in their excellent mechanical properties, also makes these materials insoluble in everything except strong acids. Dissolution of rigid rods in acid occurs by protonation of the heteroatoms but is limited by charge delocalization along the chain resulting in fewer protonations. Processing is therefore difficult. Attempts have been made to improve the solubility characteristics by inserting pendant groups on the polymer chain, or small numbers of flexible groups into the chain. These changes usually resulted in improved processability at the expense of the thermal stability and mechanical properties.

Rigid-rod polymers could potentially be useful as molecular reinforcement for composites or for optical applications, for example aircraft windshields. Molecular reinforcements are similar to macroscopic chopped-fiber reinforcements. The advantage of molecular reinforcements is that interfacial adhesion problems are minimized or eliminated so that fracture toughness, impact resistance and dimensional stability are improved. The use of rigid-rod polymers for optical applications has been hampered by the inherently dark colors of the polymers which result from their highly conjugated backbones.

If a method could be found to reduce the high intermolecular interactions of rigid-rod polymers it would be a great advance in the field. Reducing the intermolecular attraction would add disorder to the rods, permit greater relative protonation, enhance processability and, by reducing conjugation of the aromatic-heteroaromatic rings, would reduce the color of the rigid rod polymers.

SUMMARY OF THE INVENTION

The present invention is a rigid-rod polymer with reduced intermolecular interactions. It comprises diamantane groups interspersed among benzothiazole groups, benzoxazole groups or benzimidazole groups. This constitutes a polymer with stable cycloaliphatic groups interspersed into the aromatic-heteroaromatic backbone of the rods. The presence of the aliphatic groups decreases crystallinity by adding disorder to the rods thus minimizing interactions between the heteroaromatic groups. Interspersed aliphatic groups act as insulators and thus permit greater relative protonation. Also, the reduced conjugation of the aromatic-heteroaromatic rings reduces the color of the rigid rod polymers.

The preferred method of manufacturing this improved rigid-rod polymer is by condensation of dimethyl diamantanecarboxylate with 2,5-diamino-1,4-benzenedithiol, 1,2,4,5-tetraaminobenzene, or 4,6-diamino-1,3-benzenediol.

An appreciation of other aims and objectives of the present invention and a more complete and comprehensive understanding of it may be achieved by referring to the accompanying drawings and by studying the following description of a preferred embodiment.

DETAILED DESCRIPTION OF THE PREFERRED EMBODIMENT

There are two major requirements for aliphatic components to be used in rigid-rod polymers: the aliphatic group must have thermal stability comparable to that of the aromatic-heteroaromatic segment and it must have symmetry to allow linear connection (a cantenation angle of 180°) to the heteroaromatic segments.

Hydrocarbons containing the adamantane and diamantane cage structure are unusually stable. Polymers based on 1,3-diethynyladamantane and 1,6- and 4,9-diethynyldiamantanes have been previously studied. It has been found by TGA analysis that adamantane-based materials start to decompose around 475° C., whereas, the diamantane analogues, decompose around 520° C. Unlike adamantane, diamantane has parallel connecting bonds that are needed for use as a linking group in rigid-rod polymers.

Figure 1:
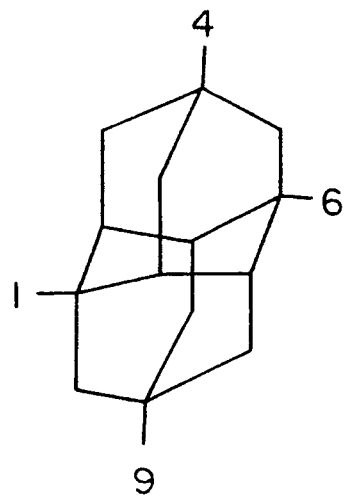
FIG. 1 is a structural representation of the diamantane molecule showing the 4,9 and 1,6 functional positions.

FIG. 1 is a structural representation of the diamantane molecule. Diamantane is named because its carbon atoms are arranged in six-membered-ring chair structures similar to the structure found in diamond. Diamantane has two axes of symmetry which makes it suitable for incorporation into rigid-rod polymers. The hydrocarbon contains 6 bridge carbons and 8 bridgehead carbons. Of the bridgehead carbons, two are "apical" (4 and 9 positions) and groups at these positions oppose one another by an angle of 180°. Similarly bridgehead carbons on the girdle are opposing at the 1 and 6 positions. Thus, diamantane derivatives functionalized at the 1,6- and 4,9-positions posses geometry suitable for incorporation into rigid-rod polymers. By contrast, the bridgehead positions in adamantane are at an angle of 109° and cannot be used.

Figure 2:
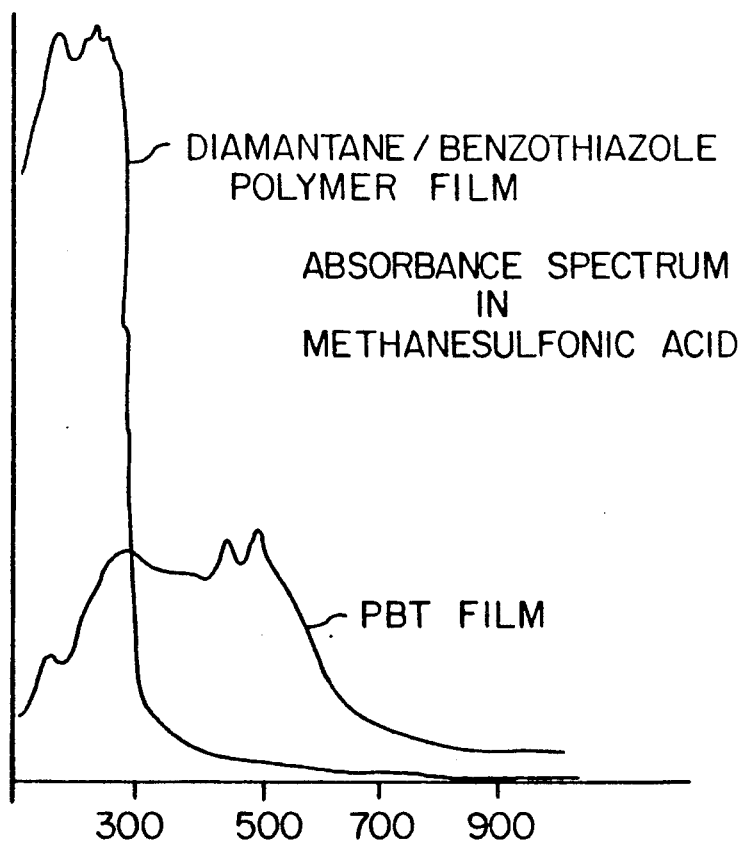
FIG. 2 is a comparison of the absorbance spectra of the diamentane/benzothiazole polymer and PBT in methanesulfonic acid through the visible region.

For incorporation into the polymer chain, dimethyl-4,9-diamantanedicarboxylate was reacted with 2,5-diamino-1,4-benzenedithiol at polymer concentrations either above (anisotropic polymerization) or below (isotropic polymerization) the critical concentration to give white polymers. The diamantane modified rigid-rod polymers exhibited nematic behavior above the critical concentration, and both stir-opalescence in solution and birefringence in polymer dopes were observed. The intrinsic viscosity of the polymer in methanesulfonic acid at 30° C. and a concentration of 0.25 g/dL was 10.2 dL/g. The diamantane modified rigid-rod polymer was cast from methanesulfonic acid and the absorption spectrum showed no absorption in the visible region. The comparison of the absorption spectra of colorless diamantane modified PBT and the highly colored PBT films is shown in FIG. 2.

Figure 3:
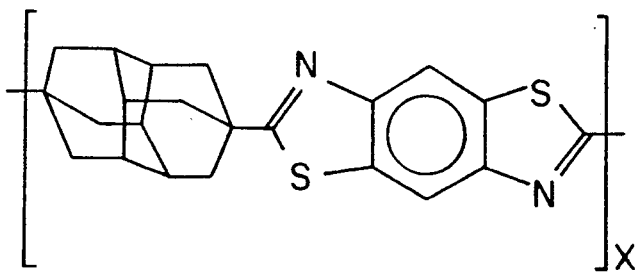
FIG. 3 is a structural representation of the 4,9-diamantane/benzothiozole polymer.
Figure 4:
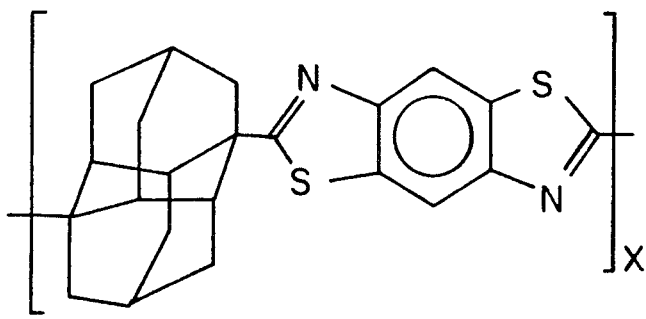
FIG. 4 is a structural representation of the 1,6-diamantane/benzothiozole polymer.
Figure 5:
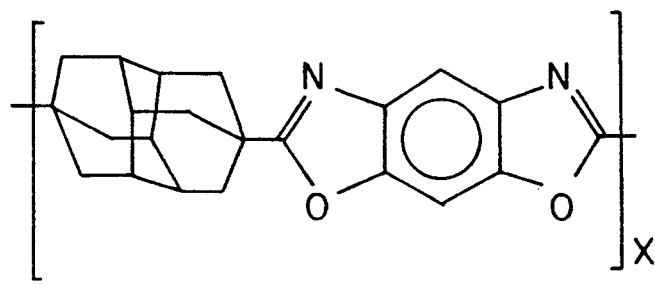
FIG. 5 is a structural representation of the 4,9-diamantane/benzoxazole polymer.
Figure 6:
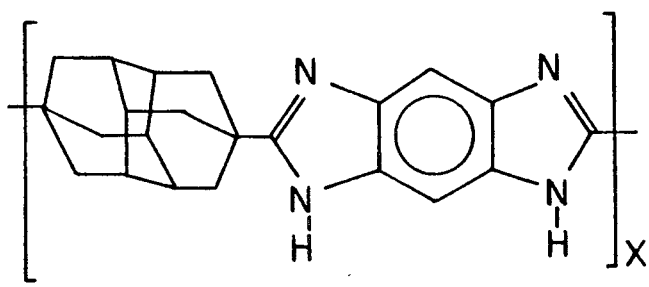
FIG. 6 is a structural representation of the 4,9-diamantane/benzimidazole polymer.

FIG. 3 shows the structure of the 4,9-diamantane/-benzathiazole polymer. Its molecular weight varies from about 10,000 to 100,000: therefore the number of units in a polymer chain probably varies from about 25 to 250. The structure of the 1,6-diamantane homologue and representative polymers made with benzoxazole or benzimidazole are shown in FIGS. 4, 5 and 6.

The following example is included to illustrate the procedure generally described above. It should be understood that this example is offered as a means of illustration and is not intended to limit the scope of this invention to any particular combination of materials, conditions, proportions, etc. set forth below.

EXAMPLE

Diamantane. Diamantane was prepared from norbornadiene by a modified route based on the procedure given in Grund, T. M.; Thielecke, W.; v. R. Schleyer, P. Org. Syn. 53, 30. Anhydrous cobalt bromide was prepared in 80% yield from cobalt carbonate and HBr. Cobalt bromide was then reacted with triphenylphosphine in toluene to give bis(triphenylphosphine)cobalt bromide in 88% yield; 1.3 Kg of this catalyst was prepared in a single reaction. Reaction of norbornadiene with the cobalt catalyst gave the dimer, Binor-S, in 68% yield, and approximately 1.5 Kg of this material was prepared.

Binor-s was hydrogenated in the presence of platinum (IV) oxide (Adam's catalyst) in a 500 mL glass Parr bomb to give tetrahydrobinor-s in 85-95% yield; 1.1 kg of this material was produced in 12 runs. The reduction required from 3 to 7 days to reach 95% completion. Recycling the catalyst was found to lower the rate of reduction. The reaction was monitored by glc analysis.

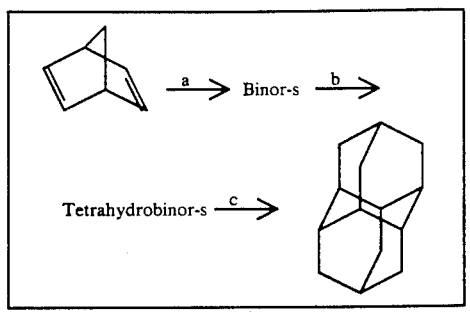

a [(C$_6$H$_5$)$_3$P]$_2$CoBr$_2$, BF$_3$.Et$_2$O, C$_6$H$_5$CH$_3$.
b H$_2$, PtO$_2$, CH3COOH
c AlCl$_3$, CH$_2$Cl$_2$

Aluminum chloride-mediated isomerization of tetrahydrobinor-s in refluxing methylene chloride gave diamantane in 50 to 82% yield. Diamantane crystallized from the reaction mixture and was purified by an acetone wash to give material that was pure by nmr and glc analysis.

4,9-Dibromodiamantane. Diamantane (50 g, 0.26 mol) was added over 1 h to bromine (200 mL) at 0° C. Aluminum bromide (5.4 g, 0.02 mol) was added and the mixture was stirred at 0° C. for 3 h and at ambient temperature for 16 h. When glc showed less than 5% monobrominated diamantanes, the bromine was removed under reduced pressure and the residue was triturated with pentane (300 mL). The precipitate was filtered, and was washed with pentane (2×150 mL) and methanol (3×100 mL). The residue was recrystallized from toluene to give 45 g (50%) of 4,9-dibromodiamantane, a white solid: mp 328° C. (lit. mp 324°–326° C.); $^1$H NMR (CDCl$_3$) δ1.97 (s, 6H) 2.31 (s, 12H); $^{13}$C NMR (CDCl$_3$) δ39.64, 48.45, 62.81.

4,9-Dihydroxydiamantane. A mixture of 4,9-dibromodiamantane (40 g, 0.12 mol) and 70% nitric acid (200 mL) was heated at 70°–75° C. until bromine evolution ceased (30 min). The reaction mixture was poured into water (250 mL) and the precipitate was filtered. The filtrate was made alkaline with 10% aqueous sodium hydroxide and the mixture was filtered. The combined precipitates were washed with water (3×200 mL) and acetone (2×150 mL), and dried to give 20.0 g (78%) of diamantane-4,9-diol, a white solid: mp 285°–287° C. (lit. mp 289.4°–291.1° C.); $^1$H NMR (CDCl$_3$) δ1.95 (s, 6H) and 1.78 (s, 12H).

4,9-Diamantanedicarboxylic Acid. Formic acid (98%, 280 mL) was added dropwise to a stirred solution of 4,9-dihydroxydiamantane (20 g, 0.091 mol) in concentrated sulfuric acid (96%, 1.3 L) at 0° C. The mixture was stirred at 0° C. for 2 h and at room temperature for 4 h, and was poured over ice/water. The solid was washed with water and acetone and dried to give 21.0 g (84%) of 4,9-diamantanedicarboxylic acid, a white solid: mp>456° C. (lit. mp 456° C.); IR (KBr) 2400–3600 (broad), 1700, and 1250 cm$^{-1}$; $^1$H NMR (DMSO-d6) δ1.75 (br. s); $^{13}$C NMR (DMSO-d6) δ35.62, 37.43, 38.6, and 178.8.

Dimethyl 4,9-Diamantanedicarboxylate. A mixture of 4,9-diamantanedicarboxylic acid (20 g, 0.072 mol), methanol (2.0 L), and concentrated H$_2$SO$_4$ (2 mL) was refluxed for 5 h. The solution was concentrated to half its original volume by distillation of solvent and the mixture was cooled in an ice/water bath. The precipitate was separated, washed with cold methanol, and dried for 4 h (0.1 mm) to give 19.0 g (86%) of 4,9-dimethyl diamantanedicarboxylate, a white solid: mp 190° C. (lit. mp 188.5°–190° C.); ¹H NMR (CDCl₃) δ1.88 (s, 18H) and 3.66, (s, 6H); ¹³C NMR (CDCl₃) δ177.36, 61.08, 38.53, 38.16, and 35.67.

Dimethyl 4,9-Diamantanedicarboxylate from Mixed Diols. Formic acid (40 mL) was added dropwise to a solution of 1,4-and 4,9-dihydroxydiamantanes (2.6 g, 11.8 mmol) in concentrated sulfuric acid (102 mL) at 0° C. The mixture was stirred at 0° C. for 5 h and then poured over ice/water. The precipitate was separated, washed with water, and dried to give 3.3 g of mixed diacids. The mixture was dissolved in methanol (160 mL) and sulfuric acid (1.2 mL) and the solution was heated under reflux for 2 h. Solvent was removed by distillation and the residue was triturated with cold methanol to give 0.5 g (14%) of 98% pure (glc) dimethyl 4,9-diamantanedicarboxylate. The product was identical by ¹H and ¹³C nmr and glc to the 4,9-dimethyl ester prepared above: mp 185.3° C.

Rigid-Rod Polymer Derived from Dimethyl 4,9-diamantanedicarboxylate and 2,5-Diamino-1,4-benzenedihydrochloride (Anisotropic Phase). A mixture of dimethyl 4,9-diamantanedicarboxylate (3.2548 g, 10.69 mmol), 2,5-diamino-1,4-benzenedihydrochloride (2.6220 g, 10.60 mmol), and 77% polyphosphoric acid (20.14 g) in a polymerization kettle was stirred under nitrogen at 80° C. for 16 h with continuous evacuation with an aspirator. The mixture was cooled to 60° C. and phosphorus pentoxide (9.0 g) was added to bring the phosphorus pentoxide content to 82%. Then, the mixture was heated at 60° C. for 2 h, at 100° C. for 2 h (at which time stir-opalescence was observed), at 120° C. for 16 h, and at 140° C. for 24 h. The mixture was poured into water and the precipitated polymer was broken into a fine suspension with a Waring blender. The solid was filtered, washed with water in a soxhlet extractor for 24 h, and dried in vacuo at 100° C. for 24 h. The polymer was a white solid with intrinsic viscosity of 10.2 dL/g at 30° C. (0.25 g/dL in methanesulfonic acid), and the absorbance spectrum between 200 and 1000 nm in methanesulfonic acid showed no absorption in the visible region. The infrared spectrum of the polymer film cast from methanesulfonic acid: 3000, 2950, 1510, 1460, 1420, 1400, 1310, 1060, 990, 880 cm⁻¹.

Rigid-Rod Polymer Derived from Dimethyl 4,9-diamantanedicarboxylate and 2,5-Diamino-1,4-benzenedithiol (Isotropic Phase). A mixture of dimethyl 4,9-diamantanedicarboxylate (0.5112 g, 1.679 mmol), 2,5-diamino-1,4-benzenedithiol (0.4118 g, 1.679 mmol), and 83% polyphosphoric acid (33.0 g) in a polymerization kettle was stirred under nitrogen at 80° C. for 16 h with continuous evacuation with an aspirator. Then, the mixture was heated at 100° C. for 2 h, at 120° C. for 16 h, and at 190° C. for 24 h. The mixture was poured into water and the precipitated polymer was broken into a fine suspension with a Waring blender. The solid was filtered, washed with water in a soxhlet extractor for 24 h, and dried in vacuo at 100° C. for 24 h. The polymer (0.6324 g) had an intrinsic viscosity of 4.6 dL/g at 30° C. (0.25 g/dL in methanesulfonic acid).

The concept of using the unique geometry of the diamantane structure for rigid-rod polymers has broader applications. 4,9-Diamantanedicarboxylic acid derivatives can be useful for the preparation of polybenzoxazoles (PBO's) and polybenzimidazoles (PBI's) by the technology described above. The 1,6 analogs may be useful similarly.

Various modifications of the polymers described above can easily be conceived. For example, it is easy to conceive of substituting many different pendant functional groups onto the diamantane component. This however, would be difficult, expensive and probably not very useful. It is also possible to conceive of incorporating other functional groups into the backbone of the polymer. Again this would be difficult, expensive and would probably degrade properties. Perhaps the only group that could be usefully incorporated into the backbone of the polymer would be phenyl.

Although the present invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A composition of matter having recurring units of the formula:

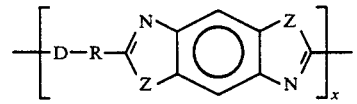

wherein D is a divalent radical selected from the group consisting of

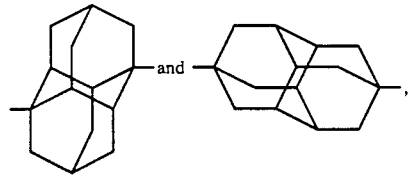

R is selected from the group consisting of

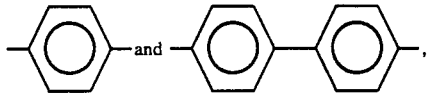

Z is selected from the group consisting of S, O and NH, and x is about 25 to about 250.

2. A composition of matter having recurring units of the formula:

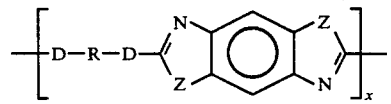

wherein D is a divalent radical selected from the group consisting of

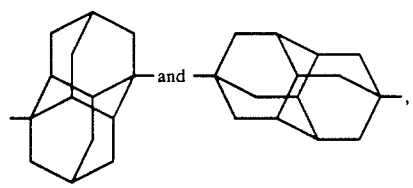

R is selected from the group consisting of

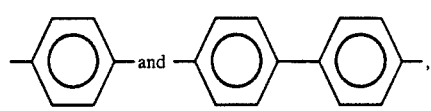

Z is selected from the group consisting of S, O and NH, and x is from about 25 to about 250.

3. A composition of matter having recurring units of the formula:

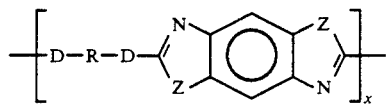

wherein D is a divalent radical selected from the group consisting of

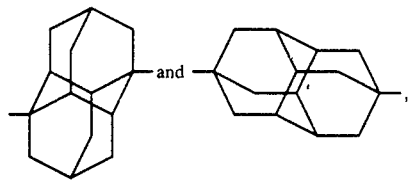

R is selected from the group consisting of

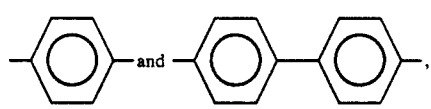

Z is selected from the group consisting of S, O and NH, and x is about 25 to about 250.

4. A composition of matter having recurring units of the formula:

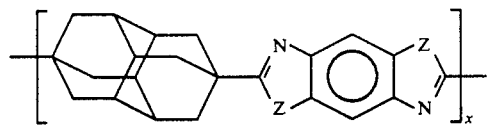

wherein Z is selected from the group consisting of S, O and NH, and x is from about 25 to about 250.

5. A composition of matter having recurring units of the formula:

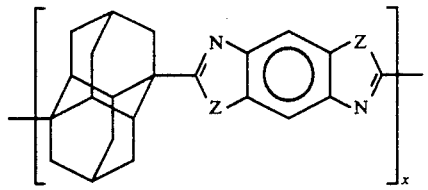

wherein Z is selected from the group consisting of S, O and NH, and x is from about 25 to about 250.

6. A method of preparing a composition of matter which comprises:
reacting a diamantanedicarboxylic acid, a diamantanedicarboxylate, or a diamantanedicarboxylic acid dihalide with 2,5-diamino-1,4-benzenedithiol to form a diamantane benzothiazole polymer.

7. A method of preparing a composition of matter which comprises:
reacting a diamantanedicarboxylic acid, a diamantanedicarboxylate, or a diamantanedicarboxylic acid dihalide with 1,2,4,5-tetraaminobenzene to form a diamantane benzimidazole polymer.

8. A method of preparing a composition of matter which comprises:
reacting a diamantanedicarboxylic acid, a diamantanedicarboxylate, or a diamantanedicarboxylic acid dihalide with 4,6-diamino-1,3-benzenediol to form a diamantane benzoxazole polymer.

9. A composition of matter which comprises:
a diamantane benzothiazole polymer made by reacting a diamantanedicarboxylic acid, a diamantanedicarboxylate, or a diamantanedicarboxylic acid dihalide with 2,5-diamino-1,4-benzenedithiol.

10. A composition of matter which comprises:
a diamantane benzimidazole polymer made by reacting a diamantanedicarboxylic acid, a diamantanedicarboxylate, or a diamantanedicarboxylic acid dihalide with 1,2,4,5-tetraaminobenzene.

11. A composition of matter which comprises:
a diamantane benzoxazole polymer made by reacting a diamantanedicarboxylic acid, a diamantanedicarboxylate, or a diamantanedicarboxylic acid dihalide with 4,6-diamino-1,3-benzenediol.

* * * * *